United States Patent
Chidambaran

(10) Patent No.: US 8,980,100 B2
(45) Date of Patent: Mar. 17, 2015

(54) LOW ENERGY REVERSE OSMOSIS PROCESS

(71) Applicant: Aquatech International Corporation, Canonsburg, PA (US)

(72) Inventor: Ravi Chidambaran, Canonsburg, PA (US)

(73) Assignee: Aquatech International Corporation, Canonsburg, PA (US)

( * ) Notice: Subject to any disclaimer, the term of this patent is extended or adjusted under 35 U.S.C. 154(b) by 0 days.

(21) Appl. No.: 13/989,939

(22) PCT Filed: Apr. 23, 2013

(86) PCT No.: PCT/US2013/037744
§ 371 (c)(1),
(2) Date: Nov. 22, 2013

(87) PCT Pub. No.: WO2013/163146
PCT Pub. Date: Oct. 31, 2013

(65) Prior Publication Data
US 2014/0076807 A1   Mar. 20, 2014

Related U.S. Application Data

(60) Provisional application No. 61/636,930, filed on Apr. 23, 2012.

(51) Int. Cl.
*B01J 49/00* (2006.01)
*C02F 1/42* (2006.01)
(Continued)

(52) U.S. Cl.
CPC .............. *C02F 1/444* (2013.01); *B01D 61/58* (2013.01); *B01D 65/02* (2013.01); *B01D 65/06* (2013.01);
(Continued)

(58) Field of Classification Search
None
See application file for complete search history.

(56) References Cited

U.S. PATENT DOCUMENTS 5,244,579 A * 9/1993 Horner et al. ............... 210/652
7,473,362 B1 * 1/2009 Nohren, Jr. ............. 210/321.64
(Continued)

FOREIGN PATENT DOCUMENTS

CN     1552643 A     12/2004
CN   102020380 A      4/2011
(Continued)

OTHER PUBLICATIONS

Graves, Michael J. "Water, water everywhere, and not a drop to waste . . . " 2008, pp. 1-4, American Public Works Association website (http://www.apwa.net/Resources/Reporter/Articles/2008/2/Water-water-everywhere-and-not-a-drop-to-waste).*
(Continued)

*Primary Examiner* — Nam Nguyen
*Assistant Examiner* — Clare Perrin
(74) *Attorney, Agent, or Firm* — Buchanan Ingersoll & Rooney PC

(57) ABSTRACT

We provide a system and method for reverse osmosis treatment of water, including seawater and brackish water. Methods and systems of embodiments of the invention may include, for example, ultrafiltration followed by biofoulant removal, both of which precede reverse osmosis. In preferred embodiments the system is run at a low flux. For example, a flux of 6-8 GFD may be used with seawater. Additional embodiments may provide the above process in conjunction with a reverse-osmosis membrane cleaning system. The membrane cleaning system is a "clean in place" system that includes use of the natural pressure differential in the reverse osmosis system to remove biofoulants and their precursors.

17 Claims, 9 Drawing Sheets

(51) Int. Cl.
| | |
|---|---|
| *B01D 15/00* | (2006.01) |
| *B01J 39/00* | (2006.01) |
| *B01D 37/00* | (2006.01) |
| *C02F 1/00* | (2006.01) |
| *B01D 61/00* | (2006.01) |
| *A61M 1/16* | (2006.01) |
| *C02F 9/00* | (2006.01) |
| *C02F 1/44* | (2006.01) |
| *B01D 61/58* | (2006.01) |
| *B01D 65/02* | (2006.01) |
| *B01D 65/06* | (2006.01) |
| *C02F 1/48* | (2006.01) |
| *B01D 1/00* | (2006.01) |
| *B03D 1/00* | (2006.01) |
| *C02F 1/24* | (2006.01) |
| *B01D 24/00* | (2006.01) |
| *B01D 25/00* | (2006.01) |
| *B01D 27/00* | (2006.01) |
| *B01D 29/00* | (2006.01) |
| *B01D 33/00* | (2006.01) |
| *B01D 36/02* | (2006.01) |
| *B01D 61/02* | (2006.01) |
| *B01D 61/14* | (2006.01) |
| *C02F 1/46* | (2006.01) |
| *C02F 103/08* | (2006.01) |

(52) U.S. Cl.
CPC ... *C02F 1/48* (2013.01); *C02F 9/00* (2013.01); *B01D 61/025* (2013.01); *B01D 61/145* (2013.01); *C02F 1/24* (2013.01); *C02F 1/42* (2013.01); *C02F 1/441* (2013.01); *C02F 1/46* (2013.01); *C02F 2103/08* (2013.01); *C02F 2303/10* (2013.01); *C02F 2303/16* (2013.01)

USPC ......... 210/677; 210/663; 210/685; 210/703; 210/745; 210/805; 210/806; 210/96.2; 210/195.2; 210/323.1

(56) References Cited

U.S. PATENT DOCUMENTS

| | | | |
|---|---|---|---|
| 2005/0006295 A1* | 1/2005 | Bharwada | 210/321.6 |
| 2005/0236335 A1* | 10/2005 | Karaman | 210/665 |
| 2007/0295650 A1* | 12/2007 | Yoneda et al. | 210/97 |
| 2008/0190849 A1* | 8/2008 | Vuong | 210/652 |
| 2008/0290030 A1* | 11/2008 | Nagghappan et al. | 210/639 |
| 2010/0032375 A1* | 2/2010 | Jagannathan et al. | 210/638 |

FOREIGN PATENT DOCUMENTS

| | | | |
|---|---|---|---|
| RU | 2033976 C1 | 4/1995 | |
| RU | 2294794 C2 | 3/2007 | |
| SU | 1205880 A1 | 1/1986 | |
| WO | WO 2011042704 A1 * | 4/2011 | |
| WO | WO2011042704 A1 * | 4/2011 | C02F 1/00 |
| WO | WO2011133159 A2 * | 10/2011 | B01D 25/02 |
| WO | WO 2011133159 A2 * | 10/2011 | |

OTHER PUBLICATIONS

Graves et al. AWPA Website, "Water, water everywhere, and not a drop to waste . . . ", Feb. 2008, pp. 1-4.*
International Preliminary Report on Patentability and Written Opinion for PCT/US2013/037744 dated Sep. 5, 2013.
Karelin F.N., Water desalination by reverse osmosis, M., Stroyizdat, 1988.
Office Action for Chinese Patent Application No. 201380000380.0 dated Sep. 3, 2014 (translation).

* cited by examiner

LOW ENERGY REVERSE OSMOSIS PROCESS

CROSS REFERENCE TO RELATED APPLICATIONS

This application is the United States national phase under 35 U.S.C. §371 of PCT International Patent Application No. PCT/US2013/037744, filed on Apr. 23, 2013 and claiming priority to U.S. Provisional Patent Application No. 61/636,930, filed on Apr. 23, 2012, and incorporated by reference herein.

BACKGROUND OF THE INVENTION

1. Field of the Invention

Embodiments of the invention relate to methods, systems, and processes for desalination using reverse osmosis.

2. Background of the Related Art

Water desalination is growing to meet industrial and drinking water demand worldwide. Although both thermal desalination (multi effect distillation or "MED", and multi stage flash evaporation or "MSF") and membrane based seawater reverse osmosis ("SWRO") processes are used in these plants, SWRO has grown predominantly over the last 15-20 years. SWRO has become very cost effective and efficient in terms of energy consumption as compared to where the technology was few years ago.

In conjunction with the ascendance of SWRO, there have been several developments related to low energy membranes and energy recovery devices designed to reduce energy consumption. At the same time, energy costs have been increasing more steeply, and there is a continuous need for reduced energy consumption in SWRO plants to offset the energy costs and maintain cost of water. This challenge is mostly experienced with seawater plants due to higher energy consumption, but there has been elevated attention on brackish water plants as well, due to significant increases in energy costs. These energy costs are further exacerbated by escalation of energy costs due to fouling problems during plant operation.

One challenge with plant management is that once the plant has been designed for some energy consumption, the plant's energy consumption does not remain steady and consistent once the water production starts. This may be due to several reasons, but predominantly it is because of fouling, scaling or membrane compaction. Out of these three, scaling may be the biggest contributor to energy consumption in brackish water, but fouling is the biggest cause of energy consumption in seawater and surface water-based RO plants. Moreover, due to heavy emphasis on recycling and reuse of water, it has become typical to design RO brackish water plants at as high as 97-98% recovery, which makes the fouling and scaling problems much more challenging. Sometimes the water itself may not be scaling but due to initiation that has already happened due to some other reasons scaling salts may start precipitating.

Another serious problem that RO plants encounter is biofouling, which reduces productivity of water, increases the differential pressure and increases power consumption. This problem is compounded in plants where there are open intakes and where water temperature increases during summer. Chlorine treatment makes this worse due to formation of oxidized products, which provide potent feed for the residual bacteria right on the membrane surface where they are rejected along with the bacteria after the de-chlorination process. Chlorination typically cannot be considered as a sustainable process option to control bio fouling, because the balance bacteria left after chlorination multiply much faster after de-chlorination with the potent nutrients as food for bacteria. Therefore it is not prudent to depend on chlorination to control bio-fouling on membranes. Moreover chlorinated organic products may be undesirable due to formation of carcinogens. Alternative techniques to control, minimize or eliminate bio-fouling are of significant interest.

Other chemical approaches like biocide treatment have found limited success and are too expensive. There have been several approaches which plants have adopted by optimizing chlorination and de-chlorination dosing, their locations and frequency including shock chlorination in the pretreatment section. These approaches have improved productivity and reduced the magnitude of this problem but have not provided a sustainable solution for plant productivity and power consumption efficiency. So there is a need to improve bio-fouling performance of SWRO and surface water and recycle reuse RO plants. Bio-fouling increases the power consumption so a low energy membrane design cannot work alone without a comprehensive approach on bio fouling control.

In an effort to maintain healthy operational efficiency in terms of water production and energy consumption, membranes should be kept in clean condition with minimum differential pressure across membranes. As the differential pressure increases it becomes difficult to clean the membranes and regain the original performance when the membrane was in its clean condition. It is also known that with higher differential pressure, permeate quality deteriorates. Beyond a point, cleaning conditions become much more aggressive and cleaning chemicals must be used for a longer time to reestablish clean membrane performance. As a matter of fact, some part of the fouling becomes irreversible and permanent. Many chemical cleanings are not practical to perform under aggressive conditions because membranes lose performance. Moreover disposal of cleaning chemicals need elaborate treatment and neutralization, which consumes additional chemicals.

BRIEF SUMMARY OF THE INVENTION

We present a novel RO desalination process that focuses on achieving low energy consumption, at least in part by reducing biofouling on the membrane through process design, and integrating a cleaning methodology that prevents buildup of any residual biofilm on the membrane surface. To achieve sustainable lower energy consumption it is important to ensure the membranes do not foul and the differential pressure does not increase. A cleaning methodology should be available to clean membranes in a very initial phase of biofouling formation, before it impacts differential pressure, and before any fouling becomes permanent and starts impacting plant performance in terms of water production, power consumption and product quality.

Our process offers a number of advantages. Where typical processes encounter substantial biofouling when flux is reduced, our combination of ultrafiltration and biofoulant removers at low flux operation reduces both the amount and severity of biofouling and energy consumption. The combination of these features provides a unique low energy and low fouling process. Further, by decreasing the severity of the biofouling, we are able to provide an effective low-pressure differential osmotic cleaning mechanism that is low-cost, low-chemical, and effective, and that makes sure sustained low energy operation can be continued.

DETAILED DESCRIPTION OF THE INVENTION

Figure 1:
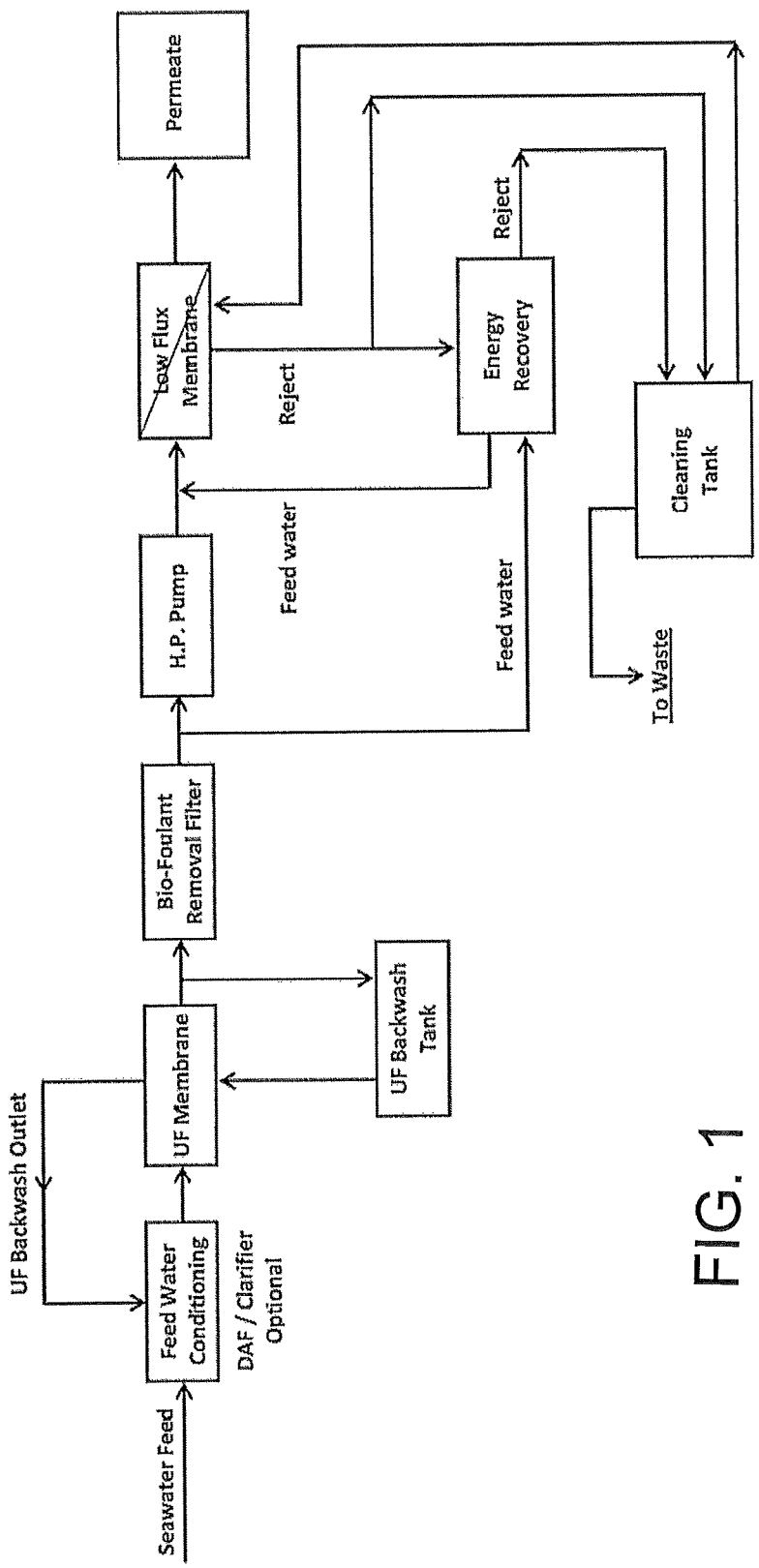
FIG. 1 shows a block flow diagram of a low energy SWRO process of one embodiment of the invention.

We present a novel RO desalination process that focuses on achieving low energy consumption by reducing biofouling by design on the membrane surface and integrating a cleaning methodology that prevents buildup of any residual biofilm on the membrane surface. This is made possible by the following an innovative process approach that may include one or more of the following aspects.

Ultrafiltration. Typical embodiments include an ultrafiltration pretreatment step. Ultrafiltration membranes may give more than 6 log reduction of bacteria and 1-2 log reduction of virus load when used to treat typical seawater or brackish water.

In a preferred embodiment the ultrafiltration membrane will have a molecular weight cutoff of approximately 100,000 and a membrane pore size less than 0.1 micron.

More preferably the membrane pore size is between 0.02 and 0.05 micron. The ultrafiltration permeate provides a silt density index ("SDI") of less than 3, and very often between 1-2.

UF is able to remove majority of the colloidal particles, which are positively charged in nature. It also removes some biofoulants, but it is not able to remove all contaminants that may cause biofouling on membranes.

To calibrate the performance of UF, the UF should receive water of turbidity around 5-8 Nephelometric Turbidity Units ("NTU"), preferably 6-7 NTU. Optional treatment of water upstream of UF may be designed to achieve these parameters. This may be accomplished by one of skill in the art with the benefit of this disclosure and based on water analysis and site conditions. This level of inlet turbidity will deliver a product quality of UF permeate to around 0.06-0.08 NTU and SDI values of less than 3. If the UF performance is not calibrated, there will be excessive load on the downstream system, and it will not perform at a preferred level. Use of feed water at this level of turbidity also ensures the downstream system is not going to experience any colloidal load of positively charged particles which would soak up capacity that should be made available to remove leftover charged biofoulants.

Biofoulant Removal. Further treatment happens through a biofoulant removal step. This step removes a majority of nutrients that are potential biofilm formers. This includes, for example, humic acids, polysaccharides, proteins, amino acids, carbohydrates, bacteria, viruses, and other potential bio film formers. Although ultra-filtration membranes provide the filtered water properties mentioned above, UF does not reduce all types of TOC. Since the pre-filtered water goes through the ultrafiltration membranes before going through the biofoulant removal filter, the biofoulant removal filter will deliver large quantities of treated water with much more reduced turbidities and SDI while removing a majority of biofilm formers relative to untreated or conventionally treated water. The biofoulant filter will further provide 6 log reduction of bacteria and 1-4 log reduction of virus. Therefore, the downstream water will be virtually disinfected without use of any chemicals, and will be without biofoulants to serve as nutrients for bacteria. This diminishes the chances of any biofilm formation on a membrane surface.

The typical SDI value at the outlet of a biofoulant filter is less than 1 and typically close to 0.6-0.8. The process highlights the importance of treating biofoulants downstream of UF treatment, which is critical for eliminating or minimizing biofilm formation at reduced flux of RO.

There are multiple options for biofoulant or nutrient removal. They operate under a wide range of TDS and provide TOC reduction of at least 40-60%, preferably at least 60-80%, most preferably at least 80%, on an overall basis, but remove the bulk of the negatively charged TOC. Suitable biofoulant or nutrient removal can be accomplished through, for example, ion exchange materials, positively charged media or electro-chemical or electrodes based methods. Cleaning, disinfection or regeneration improves the bio foulant media performance. This is done by chemical or electro chemical methods. This is an optional feature of this scheme. It should be herein that total organic carbon, or "TOC," is used throughout this disclosure as a measure of biofoulants.

Reduced Flux. System Design and plant operation are done at lower flux than conventional reverse osmosis systems. Although typical reverse osmosis is conducted at 10-20 GFD, our process uses flux at an energy efficient point where reduction of flux does not reduce energy consumption. In preferred embodiment the flux that is used (alternatively referred to as the "operating flux") is at a level where further reduction of flux does not reduce energy consumption by more than 5% relative to the energy consumption at the prior flux level.

This is range of flux is around 6-8 GFD (gallons/square foot/day) for SWRO and could be around 10-12 for BWRO and 6-8 GFD, or, in some embodiments, 8-10 GFD for waste water RO. This is based on feed water quality, permeate quality requirement and temperature range. This is done through a low flux reverse osmosis (RO) process. The flux can be marginally increased for lower total dissolved solids (TDS) or low fouling waters. For example, it might be increased by 5-10% more than what is stated above.

Although a flux of less than 6-8 may be used for SWRO, typically but below this flux there could deterioration in permeate quality and also does not provide any energy savings. At this level of 6-8 GFD flux there is reduction in the concentration of bacteria and nutrients over the membrane surface and this reduces the buildup of differential pressure to minimum. Moreover at this reduced flux operating pressures reduce significantly. For example, operating pressure may be reduced by about 10-20%. So this flux was determined to be the best for SWRO for providing the low energy service with minimum bio fouling. Similarly lower level fluxes were determined for other sources of water also.

It must be emphasized that the operation at reduced flux is not merely an example of optimization of flux to reduce energy consumption. At reduced flux alone without UF and biofoulant or even with UF and without bio foulant removal filter one may be able to achieve low energy consumption to start with but can not sustain low energy operation due to bio fouling problems as evidenced in the exampled provided below. To the contrary, the reduced flux was unexpectedly determined to lead to a reduced energy consumption on a sustained basis by virtue of the inclusion of the ultrafiltration and biofoulant removal filter. This process of low flux works at minimum energy consumption on a sustained basis in combination with ultrafiltration and biofoulant filtration in combination.

Use of low flux provides additional advantages by providing a minimum variation in difference in operating pressure with variation of feed water temperatures. When the design flux is higher as per the conventional process, there is significant variation at operating pressures at minimum and maximum pressures. This requires sophisticated controls to adjust or control the pressures but this still results in loss of energy when the actual temperatures are higher than design pressures. Alternatively speed control devices have to be installed to adjust pump RPM for changes in water temperatures which still result in some loss of energy but make the system complex and expensive. Operation at low flux design avoids this complication and reduces energy consumption by 20%. In some embodiments one or more of pressure control and speed control devices for adjustment of pump flow may be excluded, though in many cases for reasons of safety or flexibility they might still be present unless specifically excluded by the claims.

Figure 6:
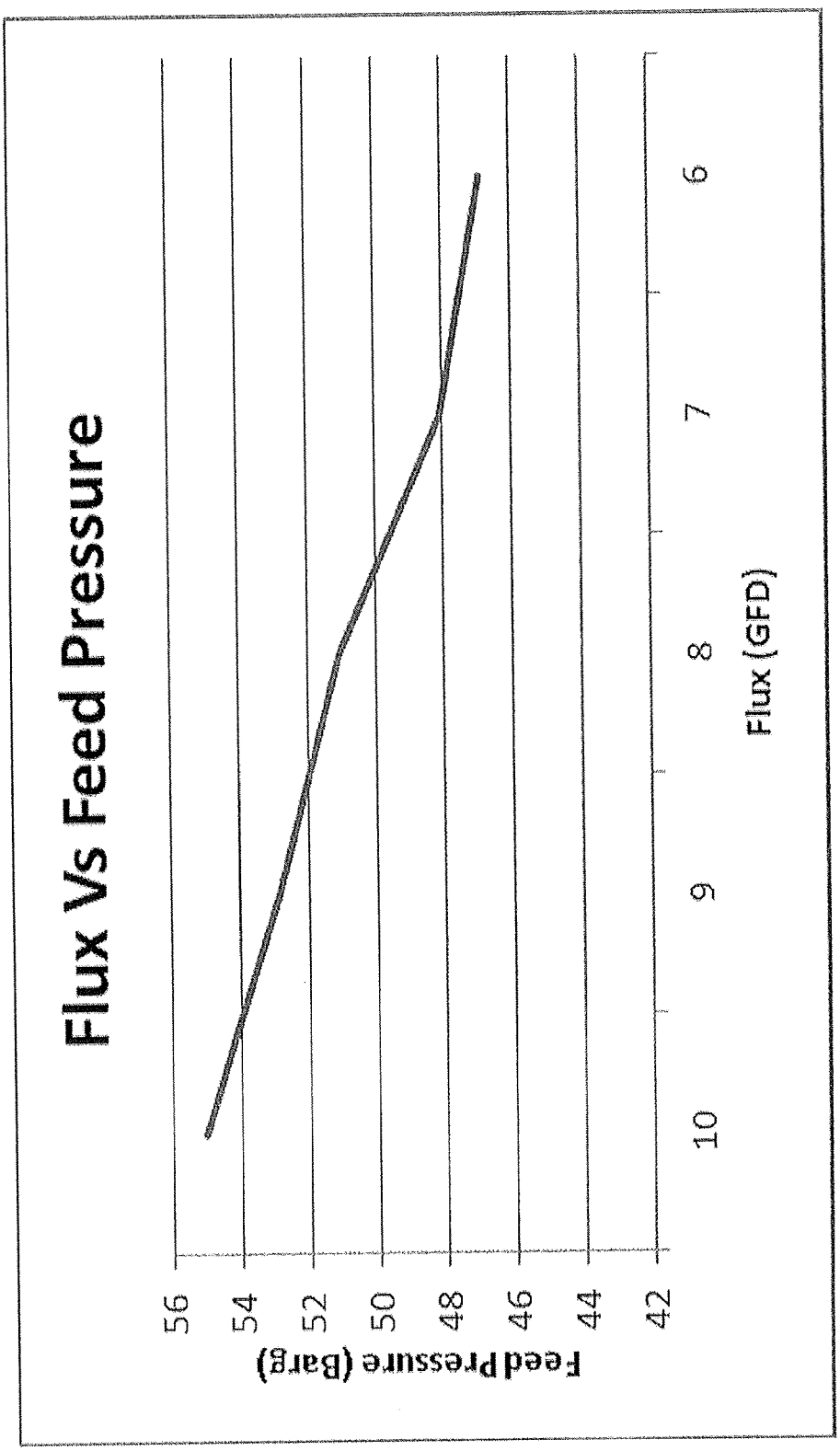
FIG. 6 shows a graph of flux vs. feed pressure.
Figure 7:
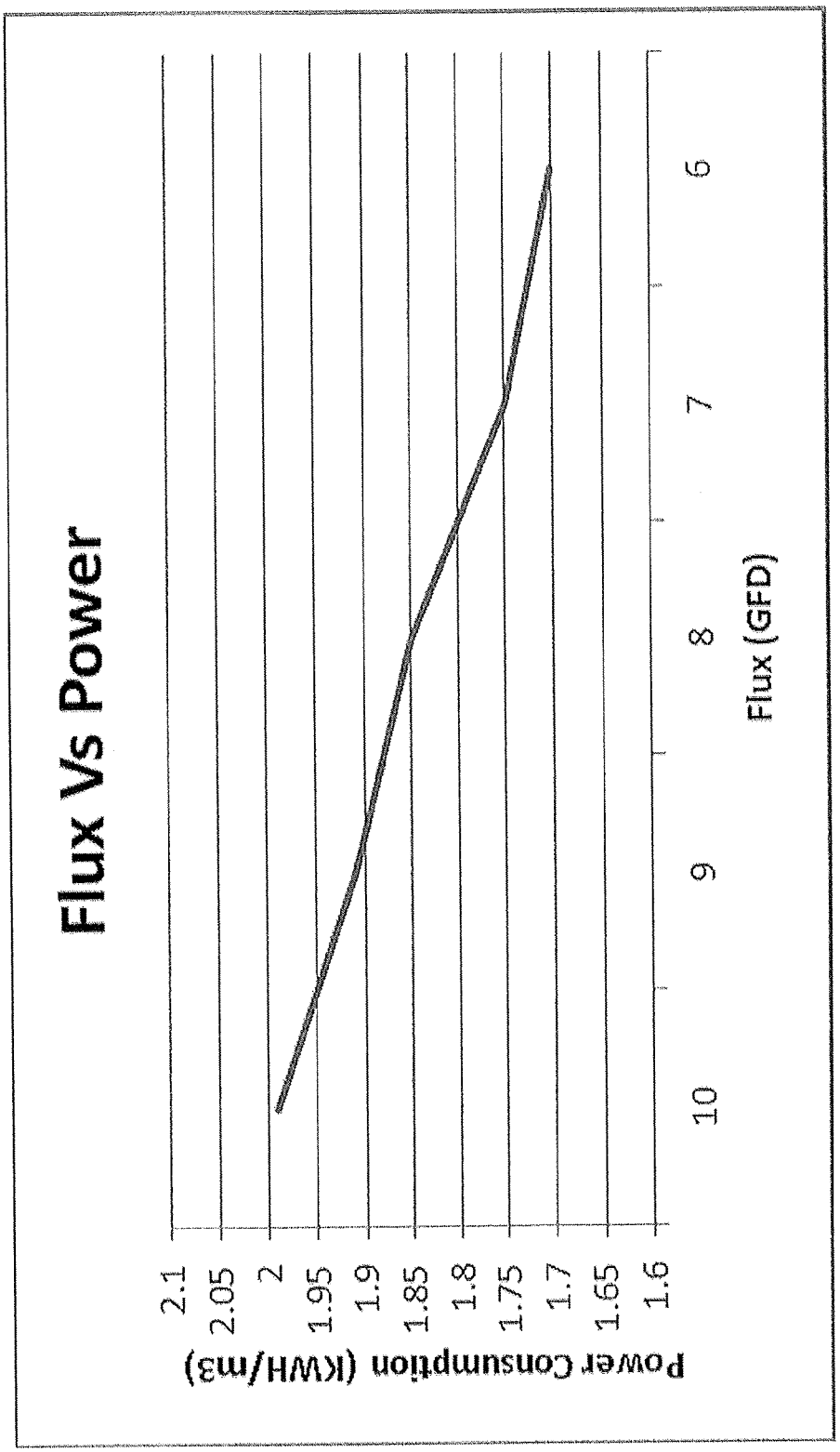
FIG. 7 shows a graph of flux vs. power.
Figure 8:
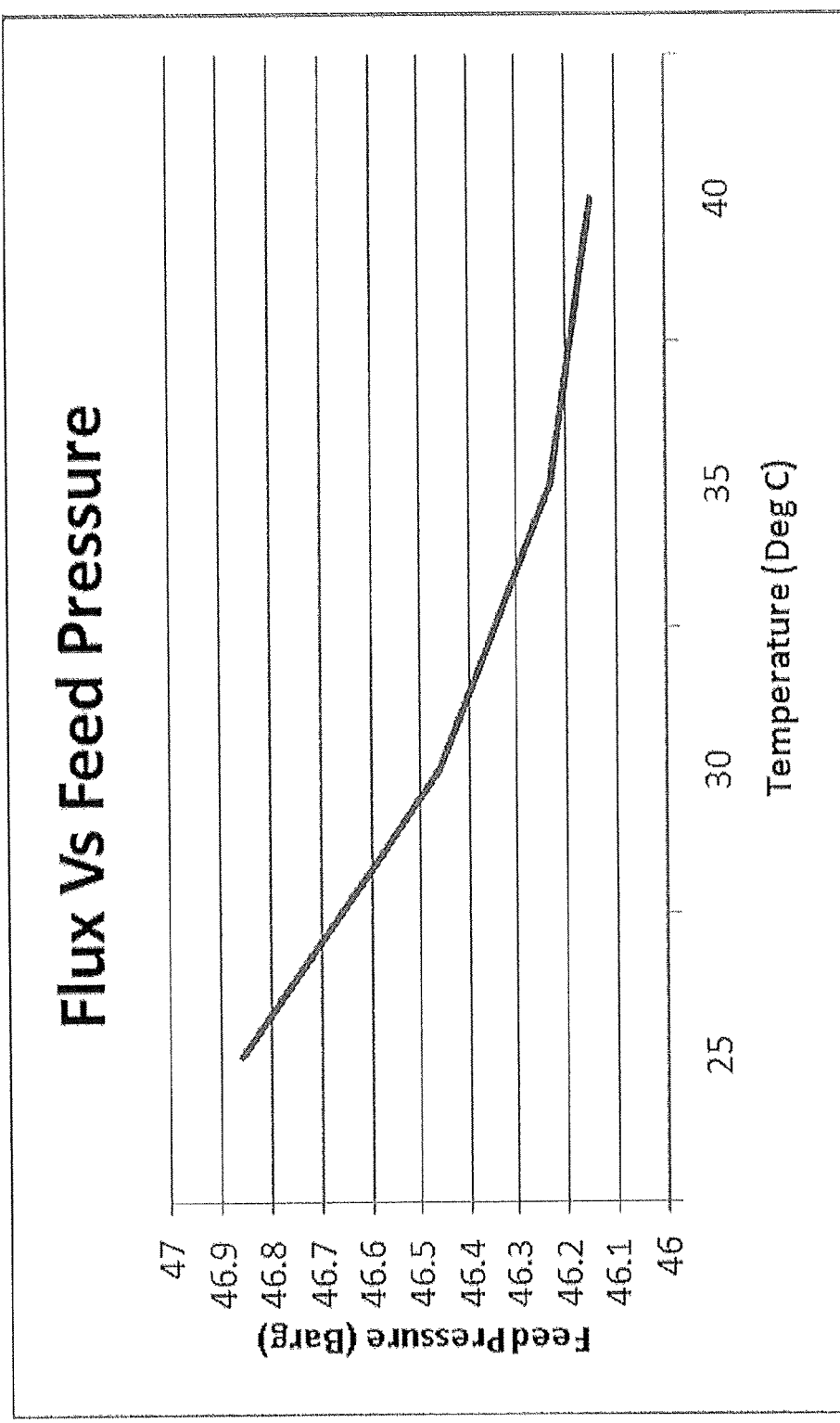
FIG. 8 shows RO feed water temperature vs. feed pressure.
Figure 9:
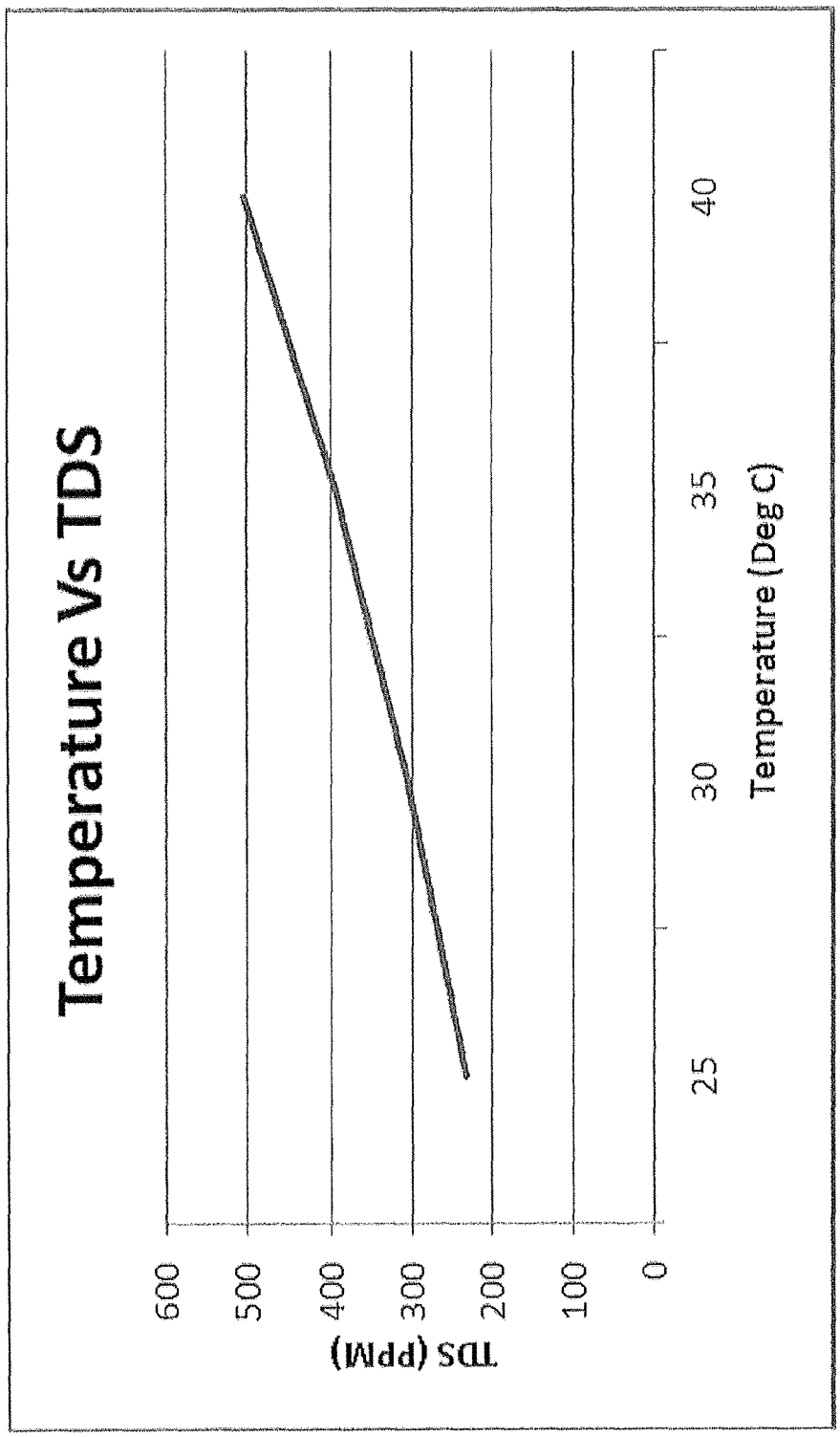
FIG. 9 shows RO feed water temperature vs. permeate total dissolved solids.

To provide one embodiment of the invention we conducted a detailed analysis of 35000 ppm TDS water to determine if our novel method might reduce energy consumption. For example, for 35000 PPM TDS, if the system is designed at 9-10 GFD, the power consumption is around 2 KWH/M3 for the RO pump and energy recovery system. If the same system is designed at 6 GFD the power consumption reduces to 1.7 KWH/M3 (FIG. 7) and reduces feed pressure from 55kg/cm2 to 46 kg/cm2 (FIG. 6). At this level variation in pressure due to feed water temperature within a wide range of 25-40 ° C. is only 0.5-0.7 kg/cm$^2$ (FIG. 8) for different types of membranes and provides TDS within acceptable limits even at the highest possible temperature (FIG. 9). The energy consumption has been calculated based on 85-86% efficiency of pumps and more than 96% efficiency of motors.

This data is more of less consistent for different membrane makes available from different membrane manufacturers. The difference if any is very small. It is evident from these studies that at these levels of flux the energy consumption is at best levels, can handle wide range of temperature with minimum variation in power and also provides acceptable range of permeate TDS. But the biggest benefit is at this level of flux the biofilm formation is reduced to insignificant levels, especially when it is pretreated with UF and with a biofoulants removal device as mentioned above. This makes sure that energy consumption design is not only minimum to start with but also remains low on a sustained basis due to reduced or insignificant bio fouling.

Over a period of a day operation the increase of differential pressure less than 0.1 kg/cm$^2$ and more often less than any detection limits. Also, due to reduced driving pressure across the membrane whatever fouling happens is not firmly attached to membrane surface due to lack of a charge. Therefore it can be easily removed under mild cleaning conditions. If one takes certain precautions in pretreatment as described below, the residual foulants are not able to adhere to the membrane surface, which is reflected on the trend of increase of differential pressure.

Some of these concepts are similar for surface water or brackish water and waste water recycle based RO plants, including some low TDS waters, where severe fouling happens on reverse osmosis and energy consumption creeps and water production eventually drops. It has been seen that bio fouling alone can increase the differential pressures across RO stages to more than 4-5 kg/cm2, which results in loss of energy. This may happen even if we have a pretreatment, which includes UF system. This can be mitigated by managing flux, calibrating and regulating pretreatment as described above, and by and stopping buildup of biofouling as mentioned below. However these sources of water may include additional pretreatment steps to mitigate hardness and silica scaling as appropriate.

Osmotic Cleaning. To further augment the process described above with a cleaning mechanism to overcome any biofouling right before it initiates, we present a unique methodology of cleaning. The method is based on natural osmotic pressure differential between reject and permeate water. When the system is stopped on a manual mode of operation with a continued regulated flow in the feed side, which allows the reject water to remain in the feed side, there is a steady flow of water from the permeate side to the feed side. The permeate flow continues to the feed side due to concentration differential. The concentration differential is maintained by makeup reject water flow to the feed side through a clean in place system. In automatic mode of operation the system does not stop but shifts into a cleaning mode but water production may stop from the complete train or part of the train. After the completion of osmotic cleaning the system shifts into water production mode. In manual mode the process may take around 10-15 minutes and automatic mode the process may take maximum of 5 minutes. This duration can be adjusted for every site.

If one allows this process to continue for few minutes for example 10-15 minutes, any biofilm is dislodged from the membrane surface. As the plant has been designed at lower flux and also the feed water has been filtered through UF and passed through a biofilm filter or device, the buildup of any biofilm pressure drop is reduced and can be easily cleaned through this cleaning.

This process should be controlled through regulated flows and concentration on both feed and permeate side using plant produced reject and permeate water. The permeate flow under these conditions is purely a function of concentration gradient and pressure drop built in the membranes due to fouling, but feed side flow is maintained by circulation of brine at a minimum flow which can overcome dilution due to permeate entry and also maintain dynamic conditions in the feed side. Therefore it possible to maintain clean membrane pressure drop conditions by using this cleaning technique and prevent any increase in feed pressure or membrane differential pressure. The loose debris can be then flushed out into the reject by at higher velocity pretreated Seawater rinsing.

This cleaning methodology is based on a concept that biofilm formation should be removed as fast as it is formed or prevented from building up. This can be achieved by shorter cleaning cycles, typically of 10-15 minutes each on a manual mode, done frequently or based on predetermined differential pressure increases over start up conditions or measurement of biofilm formation by biofilm sensors upstream of the reverse osmosis membranes. Normally the differential pressure builds up at from 0.1 kg/cm$^2$ per day to 0.3kg/cm$^2$ a day over 24 hours operation depending on site conditions and plant design. This process will typically not allow any buildup of differential pressure and the membrane will operate at clean membrane conditions.

This cleaning process is not very effective when carried out on a delayed basis at a higher differential pressure, or it may require frequent stoppages if the pretreatment has not been done to remove all bio fouling contaminants. This cleaning process can be practically and successfully employed only because the biofouling ability of water is virtually minimized in the pretreatment mentioned above. Therefore, any residual foulants can cause only minimum fouling, and their rate of buildup is insignificant and at this level. Osmotic cleaning process is very effective and virtually can keep the membranes clean.

This process has a further advantage that it does not require use of any cleaning chemicals on a daily basis, but instead uses brine generated in the reject of SWRO or BWRO plants. A chemical cleaning option can be exercised to handle any upset conditions, but typically is used very infrequently. The option of adjusting brine concentration can be exercised to control the effectiveness of cleaning process. One more advantage of this process is the water consumption in cleaning is minimum. The quantity of water consumption is approximately 0.2-2.0 litres/m$^2$ of membrane area. Osmotic gradient may be, for example, 40 to 180. Osmotic gradient is defined as the ratio of the RO reject and permeate TDS.

In this process chlorine dosing is almost eliminated or minimized to upstream of UF for any clarifier or DAF (dissolved air flotation) etc., and to UF for chemical enhanced backwash based on local conditions. But frequent or regular use of chlorine can be avoided. Any chlorine usage is restricted to offline conditions and chlorine as far as possible is not allowed to become a part of the system. In some embodiments of the invention the need for chemical addition for pretreatment of the RO feedwater is eliminated entirely.

The combination of steps mentioned above will ensure that design conditions of low power consumption will remain and the system will deliver sustained power efficiency and water production on a continuous basis. The overall process combines membrane process design for low energy and low fouling with pretreatment and cleaning processes which will mitigate fouling at the first place and further clean any fouling before it builds up without using any chemicals. Of course, those of skill in the art will recognize that additional treatment steps may be added as desired.

The flow scheme shown in FIG. 1 includes a preconditioning of seawater after it is received through the intake system through an intake pump. Depending on the seawater analysis and seasonal variations, a clarifier or DAF unit is installed to remove suspended solids. In case the seawater does not contain high level of suspended solids, one can take water through a strainer to the UF membranes. UF membranes are backwashed by the UF permeate water through a backwash pump. The frequency of backwash can be 10-20 minutes. Chlorine and caustic soda may be used infrequently to provide chemically enhanced backwash. The backwash outlet is taken to the clarifier or DAF, or directly to waste water based on the plant configuration.

The UF permeate is taken to a biofoulant removal filter after dechlorination. This filter feeds into the suction of a high-pressure pump, which further feeds into a low flux RO membrane unit. The RO permeate is taken into a permeate tank that always maintains a minimum level to provide low TDS water for cleaning requirements, and additional water is pumped for beneficial use. The reject from RO is taken through an energy recovery device. For example, a pressure exchanger may be used. The energy is transferred to water coming out of a biofoulants removal filter. After energy recovery the reject is discharged into waste after retaining a certain level of water in a clean in place tank, or "CIP" tank for the purpose of cleaning.

This configuration generates permeate water as needed at very low energy depending on the seawater TDS and temperature conditions. The sustainability of low energy is possible because of level of pretreatment through UF and biofoulant removal filters and cleaning methodology ensures that differential pressure does not build up by removal of any bio film or scaling build up on a frequent basis. Chemical consumption in pretreatment as well as later use of cleaning chemical is eliminated or minimized.

Although reported in the context of seawater recovery, this methodology can also be used in high recovery BWRO (brackish water reverse osmosis) where the potential for Bio fouling exists and the osmotic gradient of the reject water can be used to keep the membrane clean and reduce energy consumption.

Those of skill in the art will also recognize, with the benefit of this disclosure, that the processes described herein may be particularly suitable for use of reverse osmosis in zero liquid discharge, or "ZLD" processes. ZLD processes typically have thermal evaporators downstream of the reverse osmosis unit. These will benefit from the low energy consumption and sustained plant operation without loss of water production. These factors help lead to reliable operation in a ZLD system.

Certain embodiments of the invention may be better understood with reference to various examples and comparative examples as are set forth below.

EXPERIMENT-1

Figure 3:
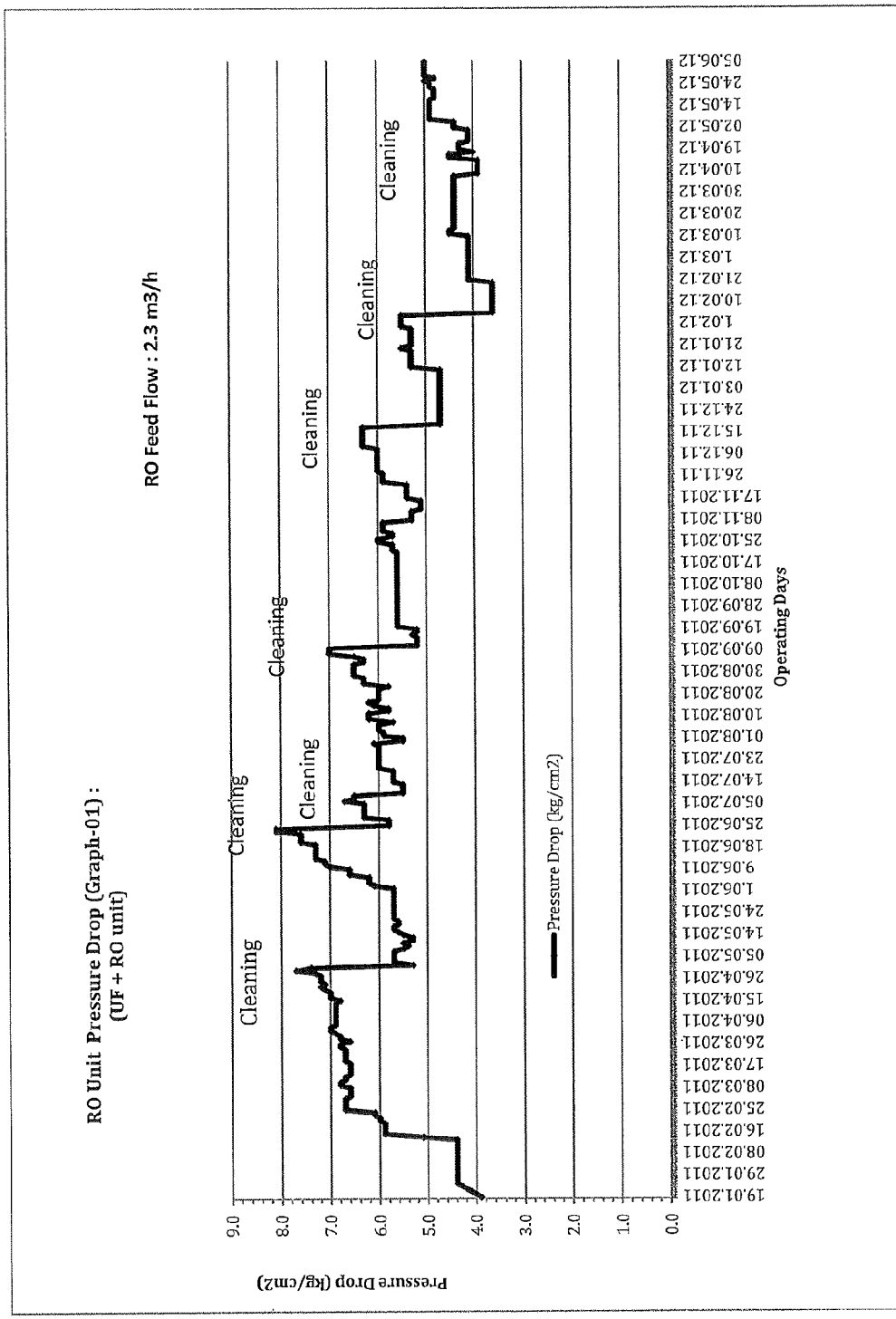
FIG. 3 shows an RO Unit performance graph when operated with ultrafiltration ("UF") only.

To benchmark base performance, a reverse osmosis (RO) unit with 2.3 m$^3$/hr flow rate was operated for 17 months on surface water having TOC level of 5-10 ppm without any biofoulant removal unit at the upstream of RO unit. This source of water was selected due to its history of biofouling for several years. Based on the original plant design, the surface water was passed through an ultrafiltration (UF) unit before feeding into an RO Unit. We maintained the silt density index (SDI) below 5, most of the time below 3. The RO unit pressure drop was monitored and its results are shown in FIG. 3.

During 17 months of RO unit operation, we cleaned the unit seven times to maintain the pressure drop of the RO Unit. It was observed that the average service cycle length of the RO Unit was around 700 hrs, and it required chemical cleaning for maintaining the pressure drop, product quality and energy consumption. Operating hours of this RO unit in different service cycles are shown in Table 1. Progressively the operating hours were adjusted so that after every chemical cleaning original starting pressure drop conditions could be regained. During this operation it was very clear that even with UF pretreatment pressure drop across RO build up was visible within days and sometimes within hours during rainy seasons and after a very elaborate cleaning process original pressure was not regained.

TABLE 1

RO Unit operating hours vs. service cycle

| RO Unit Service Cycles | RO Unit Operating Hours | Initial Pressure Drop of RO Unit (kg/cm2) | Final Pressure Drop of RO Unit (kg/cm2) |
|---|---|---|---|
| 1st Service Cycle length | 1201 | 3.9 | 7.4 |
| 2nd Service Cycle length | 717 | 5.3 | 8.1 |
| 3rd Service Cycle length | 296 | 5.5 | 6.5 |
| 4th Service Cycle length | 650 | 5.5 | 7.0 |
| 5th Service Cycle length | 859 | 5.2 | 6.3 |
| Average Service cycle length | 696 hours | | |

EXPERIMENT-2

In this experiment, a biofoulant removal unit was installed in the UF product line, and we monitored the TOC and turbidity removal across the biofoulant removal unit. The results of TOC & Turbidity are shown in Table 2. TOC of water was analyzed on Shimadzo-TOC analyzer, and the turbidity was checked by HACH-turbidity analyzer. In this experiment the biofilter was made up of electro positive media material.

TABLE 2

| UF Product TOC (ppm) | Bio-Foulant Removal unit Outlet TOC (ppm) | UF Product Turbidity (NTU) | Bio-Foulant Removal unit Outlet Turbidity (NTU) |
|---|---|---|---|
| 5.13 | 3.83 | 0.069 | 0.054 |
| 5.17 | 3.92 | 0.065 | 0.059 |
| 5.16 | 3.88 | 0.067 | 0.064 |
| 5.20 | 2.84 | 0.069 | 0.061 |
| 5.68 | 3.98 | 0.068 | 0.065 |
| 4.38 | 1.08 | 0.068 | 0.06 |
| 5.16 | 3.98 | 0.066 | 0.06 |
| 5.16 | 3.27 | 0.071 | 0.059 |
| 5.28 | 3.31 | 0.073 | 0.063 |
| 5.48 | 3.38 | 0.066 | 0.058 |
| 5.13 | 3.05 | 0.069 | 0.065 |
| 5.26 | 3.59 | 0.065 | 0.058 |
| 5.06 | 3.81 | 0.067 | 0.06 |
| 4.98 | 3.02 | 0.064 | 0.060 |
| 5.13 | 3.68 | 0.065 | 0.061 |
| 5.36 | 3.82 | 0.066 | 0.059 |
| 5.86 | 3.02 | 0.066 | 0.060 |
| 5.02 | 3.12 | 0.068 | 0.060 |
| 4.82 | 3.30 | 0.070 | 0.060 |
| 5.68 | 3.82 | 0.068 | 0.055 |
| 4.58 | 1.62 | 0.069 | 0.059 |
| 5.03 | 2.91 | 0.068 | 0.063 |
| 4.28 | 2.03 | 0.069 | 0.056 |
| 5.21 | 2.91 | 0.066 | 0.059 |
| 4.28 | 2.06 | 0.065 | 0.057 |
| 4.32 | 2.12 | 0.065 | 0.057 |

This indicates that the biofoulant removal unit removed around 40% to 60% of TOC from the product water of UF unit. Outlet turbidity of water was always around 0.060 NTU, which directly helps in maintaining the SDI level below 3 in RO Unit, and sometimes between 1-2, minimizing the biofouling in the RO Unit.

EXPERIMENT-3

Figure 4:
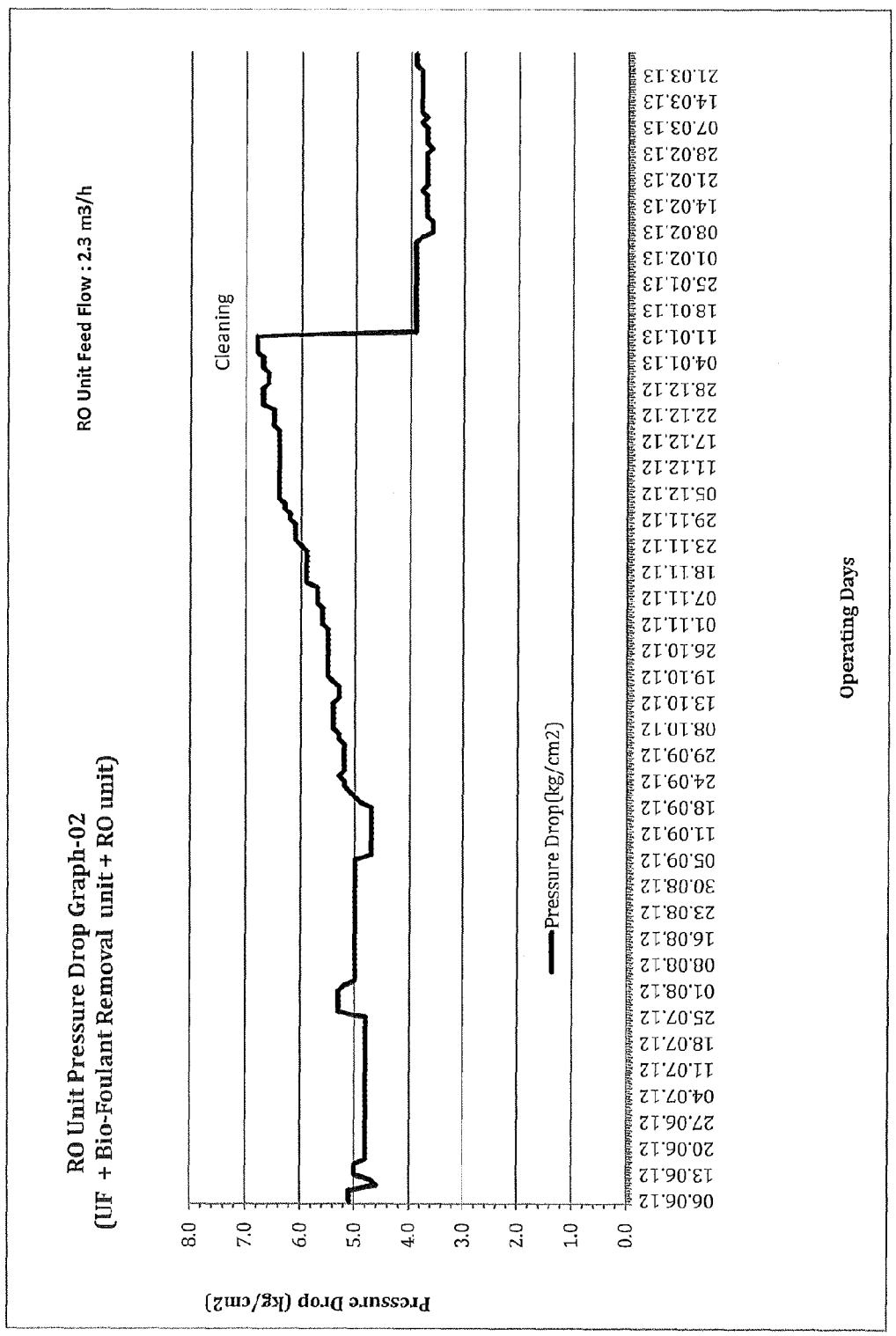
FIG. 4 shows an RO Unit performance graph when operated with UF and a biofoulant removal unit.

In another set of experiments, the same RO unit of the previous examples was operated for nine months with the inclusion of biofoulant removal unit along with UF at the upstream at the upstream of RO unit and its effect was clearly observed with respect to longer service cycle length. RO unit was operated for around 1425 hours without any cleaning, which is almost twice the previous average service cycles length of Experiment 1. In this experiment the RO unit was cleaned only once after the operation of six months. RO unit performance with bio-foulant removal unit is shown in FIG. 4. During this operation it was observed that for more than 3 months there was very insignificant increase in differential pressure but once it started increasing gradually subsequent fouling rate started accelerating and progressively started increasing.

Even though the biofoulant removal unit minimized the pressure drop rise & biofouling in RO unit, still the pressure drop gradually increased over a period of six month. The main reason for this was the gradual deposition of a fine biofilm on the RO membrane surface on a day-to-day basis. The intensity of biofouling was very low, as indicated by longer service length.

Figure 2:
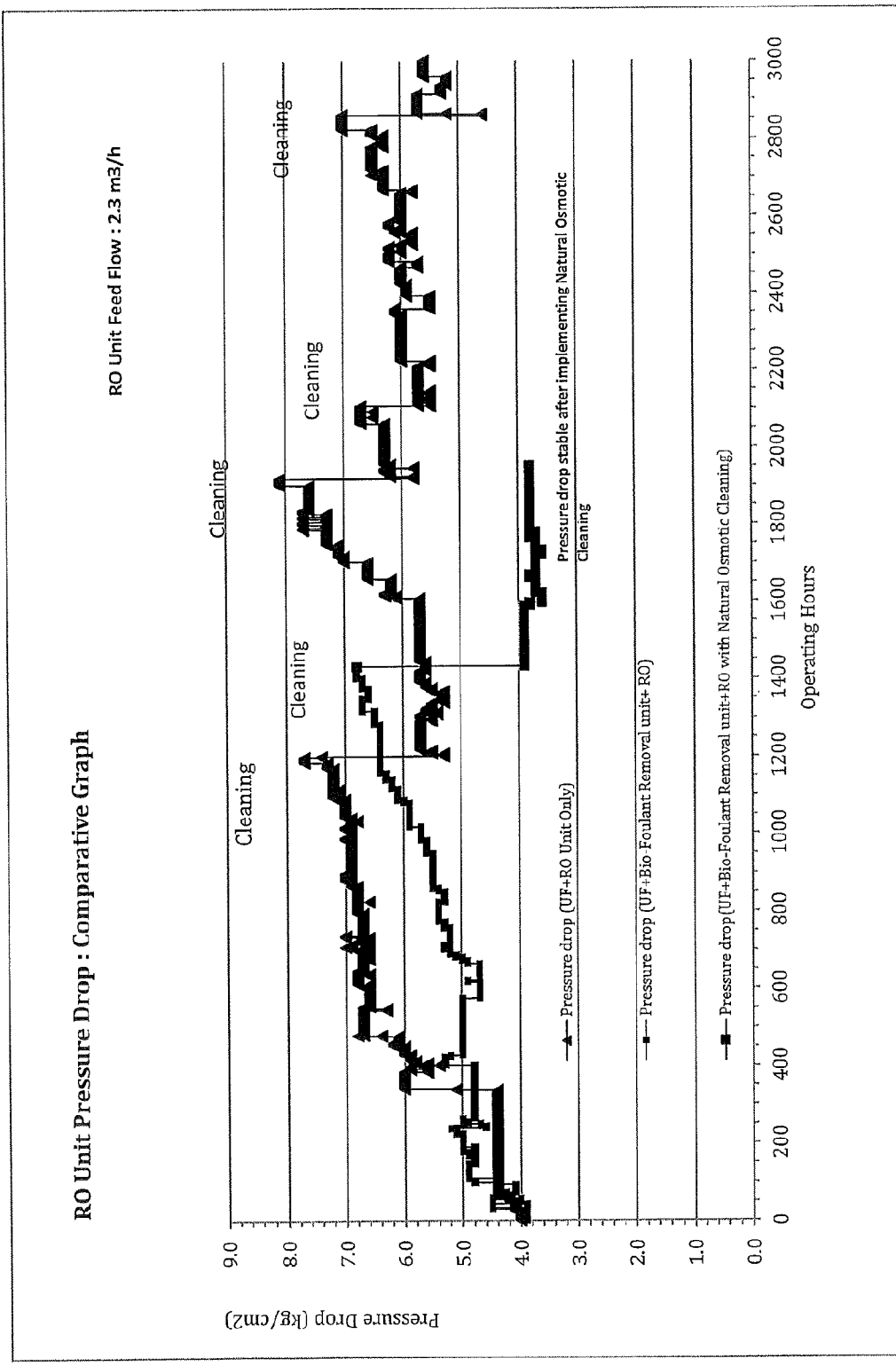
FIG. 2 shows a comparative graph of RO unit pressure drop performance under various conditions with and without additional pretreatment and osmotic cleaning.

At this stage after the normal chemical cleaning of RO unit, and bringing back its pressure drop to normal level (3.8 kg/cm$^2$), osmotic cleaning process as described in one type of the embodiment was implemented, and every day one natural osmotic cleaning cycle were performed on the RO Unit by RO Reject water for 10-15 minutes. The impact of natural osmotic cleaning was clearly observed, and the pressure drop remained unchanged at 3.8 kg/cm$^2$ for next 500 hrs. of operation as shown in FIG. 2. Due to the unchanged pressure drop of the RO Unit, its energy consumption remained the same, and no increase was observed. During this time no increase of differential pressure was seen.

It became clear at this stage that with proper feed conditions of UF and biofoulant removal filter and daily proactive osmotic cleaning clean membrane conditions can be maintained, which means no biofouling and no increase in energy. FIG. 2 shows comparative behavior of pressure drop increase under different conditions. Based on this data it is very clear that with the devised process, one can achieve sustained plant operation at lower energies.

EXPERIMENT-4

Figure 5:
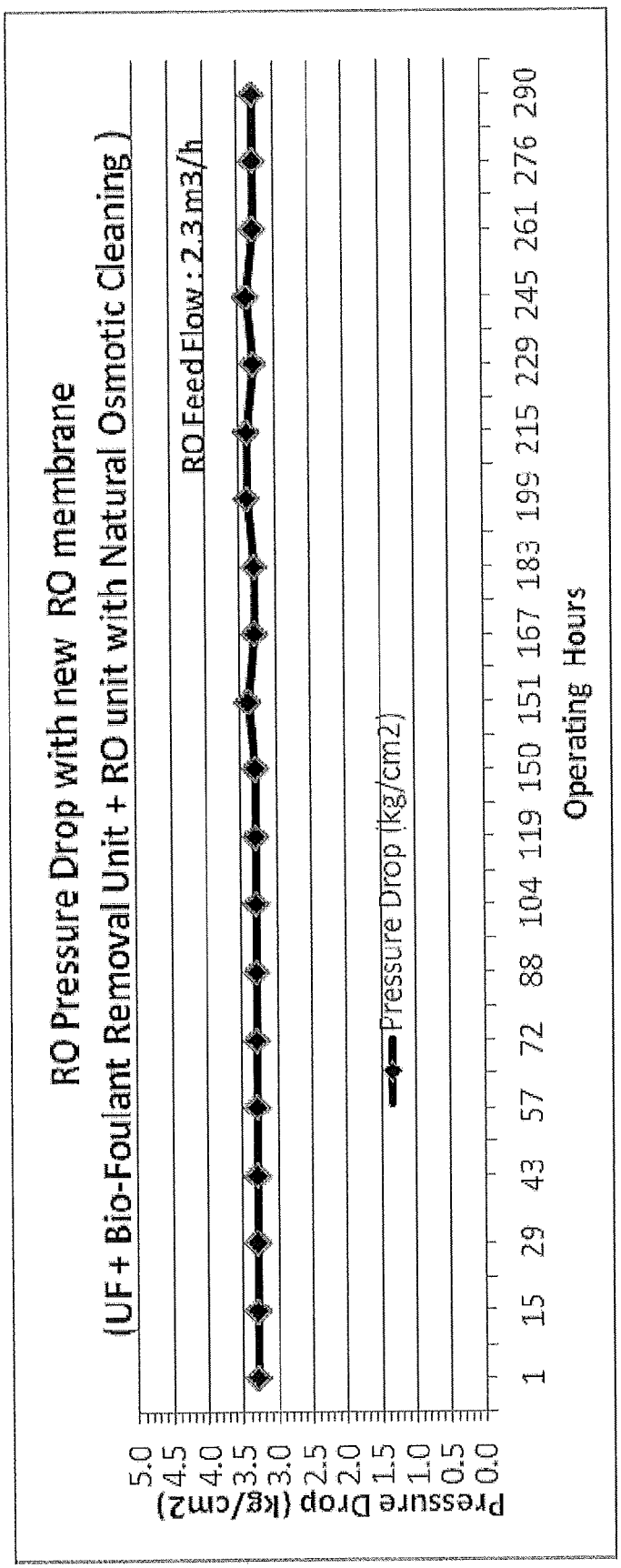
FIG. 5 shows RO Unit Performance with a new RO membrane with an embodiment of the devised process and osmotic cleaning.

In this experiment, the natural osmotic cleaning process was implemented on fresh RO membranes with low flux design having a UF and Biofoulant filter at the upstream of RO. The Experiment 3 membranes were not used because they were two and half years old. In this trial TOC rich surface water was first passed through the UF unit followed by biofoulant removal unit and then feed to RO unit. Natural osmotic cleaning was performed at osmotic gradient of around 40 and above after every 8-16 hours of operation on the RO Unit by RO reject water for 10-15 minutes. The RO Unit was operated for 150 hours, and it was observed that the pressure drop of RO unit remained unchanged as shown in FIG. 5.

This demonstrates that the RO Unit, when operated with UF followed by bio-foulant removal unit at upstream with natural osmotic cleaning at regular interval by RO unit reject water, allowed the RO unit pressure drop to remain unchanged. Its increase was minimized significantly, and the energy consumption of the RO unit was maintained to its original level.

This further demonstrated that if one constructs a RO plant for low energy based on low flux RO, as provided herein, and further if one provides pretreatment and cleaning conditions as described above, one can achieve low energy consumption in the beginning of operation. That level of energy consumption may then be sustained throughout the life of the plant.

In the above examples, ultrafiltration membranes and biofoulant removal filters were obtained from Qua Group.

Although embodiments of the invention have been discussed herein in the context of certain aspects and advantages, those of skill in the art will appreciate that various modifications may be made within the scope and spirit of the claims.

I claim:

1. A method for desalination by reverse osmosis and reverse osmosis membrane cleaning, comprising:
   providing a feed stream of water to be desalinated;
   filtering the feed stream through an ultrafiltration membrane, thereby removing turbidity including bacteria and viruses from said feed stream;
   filtering the feed stream through positively charged media, thereby removing biofoulants, bacteria and viruses from said feed stream, wherein the step of filtering the feed stream through an ultrafiltration membrane is conducted prior to the step of filtering the feed stream through the positively-charged media; and removing salt from the feed stream by reverse osmosis, wherein the reverse osmosis is conducted at an operating flux, wherein the operating flux results in an energy consumption, and wherein conducting the reverse osmosis at a flux lower than the operating flux does not reduce the energy consumption by more than 10%; and cleaning at least one reverse osmosis membrane used in removing salt from the feed stream by reverse osmosis, comprising, for a reverse osmosis membrane having a feed side and a permeate side:

maintaining a concentration differential by adding reverse osmosis concentrate to the feed side of the reverse osmosis membrane, thereby allowing the reverse osmosis concentrate to remain in the feed side and causing a flow of a permeate water from the permeate side to the feed side due to the concentration differential.

2. The method of claim 1, wherein filtering the feed stream through the ultrafiltration membrane reduces SDI of the feed stream to less than 3-5 SDI.

3. The method of claim 2, wherein filtering the feed stream through the ultrafiltration membrane reduces turbidity of the feed stream to less than 0.1.

4. The method of claim 1, wherein filtering the feed stream through the positively-charged media reduces turbidity to less than 0.08 NTU.

5. The method of claim 1, wherein said cleaning is conducted based on a preset increase in differential pressure or number of hours of operation of the reverse osmosis membrane.

6. The method of claim 1, wherein said method excludes addition of chlorine upstream of the ultrafiltration membrane, and wherein the method may include addition of chlorine during a backwash to avoid ingress of chlorine in feed steam to be desalinated.

7. The method of claim 1, wherein said feed stream is seawater, and wherein said operating flux is between 6-8 GFD.

8. The method of claim 7, wherein the TDS of the seawater is between 35,000 and 45,000 TDS.

9. The method of claim 1, wherein said feed stream is brackish water, and wherein said operating flux is less than 10 GFD.

10. The method of claim 1, wherein said feed stream is recycled waste water, and wherein said operating flux is less than 8 GFD.

11. The method of claim 1, wherein conducting the reverse osmosis at a flux lower than the operating flux does not reduce the energy consumption by more than 5%.

12. The method of claim 1, further comprising, after removing salt from the feed stream by reverse osmosis, sending a reverse osmosis reject to a thermal evaporator in a zero liquid discharge process.

13. A method for desalination of a feed stream by reverse osmosis, comprising:

preconditioning a feed stream of water for desalination by treatment in at least one member of the group consisting of a clarifier, a filter, and a dissolved air flotation unit to a turbidity of less than 8 NTU;

treating the feed stream by passage through ultrafiltration membranes;

backwashing the ultrafiltration membranes with ultrafiltration permeate water;

treating the feed stream by passage through positively-charged media for biofoulant removal, wherein the step of treating the feed stream by passage through ultrafiltration membranes occurs before the step of treating the feed stream by passage through the positively-charged media;

feeding the feed stream to a reverse osmosis membrane unit having an operating flux, wherein the operating flux results in an energy consumption, and wherein conducting the reverse osmosis at a flux lower than the operating flux does not reduce the energy consumption by more than 5%; and, producing a desalinated reverse osmosis permeate stream and a reverse osmosis reject stream;

recovering pressure from the reverse osmosis reject stream;

cleaning at least one reverse osmosis membrane used in removing salt from the feed stream by reverse osmosis, comprising, for a reverse osmosis membrane having a feed side and a permeate side:

further cleaning comprising reverse osmosis concentrate on the feed side and reverse osmosis permeate on the permeate side, and regulating flow to the feed side of the reverse osmosis membrane, thereby allowing the reverse osmosis concentrate to remain in the feed side and causing a flow of reverse osmosis permeate from the permeate side to the feed side due to a concentration differential maintained by adding reverse osmosis concentrate to the feed side.

14. The method of claim 13, comprising enhancing said backwashing of the ultrafiltration membranes by addition of chlorine and caustic soda.

15. The method of claim 13, wherein said feed stream is seawater, and wherein said flux is between 6-8 GFD.

16. The method of claim 13, wherein said feed stream is brackish water, and wherein said operating is less than 10 GFD.

17. The method of claim 13, wherein said feed stream is recycled reverse osmosis reject water, and wherein said operating flux is less than 8 GFD.

* * * * *